US012808791B2

(12) United States Patent
Lv et al.

(10) Patent No.: US 12,808,791 B2
(45) Date of Patent: Nov. 24, 2026

(54) TERAHERTZ SENSING APPARATUS FOR FINGERPRINT SPECTRUM WITH PLASMA ARRAY

(71) Applicant: University of Shanghai for Science and Technology, Shanghai (CN)

(72) Inventors: Jiaming Lv, Shanghai (CN); Lin Chen, Shanghai (CN); Yiming Zhu, Shanghai (CN); Songlin Zhuang, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 75 days.

(21) Appl. No.: 18/992,976

(22) PCT Filed: Sep. 13, 2023

(86) PCT No.: PCT/CN2023/118451
§ 371 (c)(1),
(2) Date: Jan. 10, 2025

(87) PCT Pub. No.: WO2025/050420
PCT Pub. Date: Mar. 13, 2025

(65) Prior Publication Data
US 2026/0251564 A1 Aug. 27, 2026

(30) Foreign Application Priority Data
Sep. 8, 2023 (CN) ......................... 202311156729.3

(51) Int. Cl.
*G01N 21/3581* (2014.01)

(52) U.S. Cl.
CPC ................................ *G01N 21/3581* (2013.01)

(58) Field of Classification Search
CPC ................................................ G01N 21/3581
See application file for complete search history.

(56) References Cited

U.S. PATENT DOCUMENTS 7,531,805 B1 5/2009 Gregoire et al.
2011/0017910 A1 1/2011 Nagel
2018/0364158 A1 12/2018 Wang et al.

FOREIGN PATENT DOCUMENTS

CN 109187420 1/2019
CN 110907391 3/2020
(Continued)

OTHER PUBLICATIONS

CN 110311193 A and its English translation (Year: 2019).*
(Continued)

*Primary Examiner* — Chih-Cheng Kao
(74) *Attorney, Agent, or Firm* — JCIPRNET

(57) ABSTRACT

Disclosed is a terahertz sensing apparatus for a fingerprint spectrum with a plasma array. The sensing apparatus for a fingerprint spectrum is constructed on the basis of a substrate, a plasma cell array is arranged on the substrate, and cross-recess unit cells are densely arranged in each cell of the plasma cell array. In a plasma cell, the cross-recess unit cells densely arranged constitute a complementary cross-recess unit cell array. A unit length of the cross-recess unit cells of the plasma cell of the plasma cell array is set according to a form of diagonal unidirectional gradient. In the plasma cell array, the unit length of the cross-recess unit cells of each plasma cell is evenly and discretely set in a range of 47 μm to 104 μm.

8 Claims, 9 Drawing Sheets

(56) References Cited

FOREIGN PATENT DOCUMENTS

| | | |
|---|---|---|
| CN | 115032730 | 9/2022 |
| CN | 115360496 | 11/2022 |
| CN | 117191746 | 12/2023 |
| WO | WO2023017366 | 2/2023 |

OTHER PUBLICATIONS

CN 115032730 A and its English translation (Year: 2022).*
CN 114778481 A and its English translation (Year: 2022).*
"International Search Report (Form PCT/ISA/210) of PCT/CN2023/118451", mailed on May 28, 2024, pp. 1-5.
"Written Opinion of the International Searching Authority (Form PCT/ISA/237) of PCT/CN2023/118451", mailed on May 28, 2024, pp. 1-3.
A. Roberts et al., "Plasmonic quarter-wave plate", Optics Letters, vol. 37, Jun. 2012, pp. 1820-1822.
Ding Pei et al., "Research Progress of Metamaterials for Terahertz Applications", Laser & Optoelectronic Progress, May 2011, pp. 1-10.

* cited by examiner

TERAHERTZ SENSING APPARATUS FOR FINGERPRINT SPECTRUM WITH PLASMA ARRAY

CROSS-REFERENCE TO RELATED APPLICATION

This application is a 371 of international application of PCT application serial no. PCT/CN2023/118451, filed on Sep. 13, 2023, which claims the priority benefit of China application serial no. 202311156729.3, filed on Sep. 8, 2023. The entirety of each of the above-mentioned patent applications is hereby incorporated by reference herein and made a part of this specification.

TECHNICAL FIELD

The present disclosure relates to a terahertz wave trace detection technology, and particularly relates to a terahertz sensing apparatus for a fingerprint spectrum with a plasma array.

BACKGROUND

Terahertz (THz) spectroscopy has received considerable attention in recent decades, because its energy is close to energy of intermolecular interactions such as hydrogen bonding, lattice vibration, van der waals force and molecular translation and rotation energy. Thus, as an effective means of measuring a low-frequency mode spectrum of molecules or aggregates (such as crystals, polymers and protein), terahertz has been widely used in fields of biology and chemistry.

A common technology for spectral measurement of samples in a terahertz frequency range is to mix powdered samples with binding media (such as polyethylene powder), press this mixture into a sheet, and then place the sheet on an optical path. This simple and mature technology is not suitable for trace samples and film sensing. Due to fewer interactions between terahertz waves and molecule/molecule vibration modes, it is still challenging to detect molecular vibration of films.

In order to overcome this difficulty, many recent studies have proposed various metamaterial structures, such as metal hole arrays, ring resonators and metasurface plasma antennas with metal stripes. These structures are coupled to terahertz waves and show near-field enhancement effects. A common method for sensing with a metamaterial is to detect a frequency shift response of a resonance peak caused by change of a dielectric constant of a material applied to a metasurface. This method provides a sensitive method for molecular detection by disclosing non-dispersive components of the dielectric constant of the material, without revealing vibrational fingerprint spectrum information of molecules, limiting its application.

Vibration spectra of film molecules are of universal importance in detection and identification of chemical and biological samples. At present, two mechanisms can be provided to implement terahertz film sensing for molecular fingerprint. One mechanism is based on an absorption-induced transparency (AIT) effect. This is because a wide-band mode of a metasurface resonates with a narrow-band mode of an analyte, resulting in coherent coupling. The most interesting feature of AIT is that in a system combining an artificial apparatus and a measured material, a transmission peak appears at a spectral position of resonance absorption of the measured material. This effect has been proved by arranging metal gratings and splitting ring resonators. However, due to a non-dispersive component of an actual dielectric constant of the analyte and a manufacturing error, an extra shift of metasurface resonance can be caused, which makes it difficult to match the metasurface resonance with resonance frequency of an analyte covering system. The other method is based on a multiplexing technology, which conducts detection through a strong light-substance interaction between a series of narrow-band resonance peaks on a metasurface of a medium and wide-band mode resonance of an analyte.

Current problems are as follows:

1) Frequency coverage of a series of narrow-band resonance peaks on the metasurface of the medium is currently smaller than 0.3 THz, which limits a frequency range of substance fingerprint spectrum amplification.
2) At present, a medium metasurface array technology has an uneven surface problem, such that a sample coating is uneven, bringing measurement errors.
3) A resonance peak of the metasurface of the medium is narrow, so frequency resolution of a commercial time-domain terahertz spectral system cannot satisfy an actual measurement requirement.
4) The narrow resonance peak of the metasurface of the medium makes it difficult to excite an AIT effect of a substance fingerprint spectrum.

SUMMARY

An objective of the present disclosure is to provide a terahertz sensing apparatus for a fingerprint spectrum with a plasma array. The sensing apparatus for a fingerprint spectrum can simultaneously enhance and amplify spectral lines of substances of a wide fingerprint spectrum and a narrow fingerprint spectrum.

To realize the above objective, the present disclosure uses the following technical solution:

A terahertz sensing apparatus for a fingerprint spectrum with a plasma array is based on a substrate. A plasma cell array is arranged on the substrate. Cross-recess unit cells are densely arranged in each cell of the plasma cell array.

Further, in a plasma cell, the cross-recess unit cells densely arranged constitute a complementary cross-recess unit cell array.

Further, a unit length of the cross-recess unit cells of the plasma cell of the plasma cell array is set according to a form of diagonal unidirectional gradient.

Further, the diagonal unidirectional gradient is a diagonal progressive decrease or a diagonal progressive increase.

Further, in the plasma cell array, the unit length of the cross-recess unit cells of each plasma cell is evenly and discretely set in a range of 47 μm to 104 μm.

Further, the plasma cell array is a 6×6 array.

Further, in the plasma cell array, each plasma cell is square and has a side length of 5 mm. Each plasma cell is divided into an effective zone and a peripheral zone. A square zone of 3 mm×3 mm in the middle of the plasma cell is used as the effective zone. A surrounding zone around the effective zone is used as the peripheral zone. The peripheral zone has a width of 2 mm. The cross-recess unit cells arranged in the plasma cell are all arranged in the effective zone.

Further, a structure of the cross-recess unit cell is implemented as follows: in a tiny zone of the plasma cell, a cross recess is provided in a center of the zone through photoetching, and a metal film is evaporated and deposited outside the cross recess and solidified to form the cross-recess unit cell.

Further, the metal film evaporated and deposited outside the cross recess is made of gold, silver, copper, or aluminum.

Further, the substrate is made of quartz. Alternatively, the substrate is a polyimide substrate having a thickness of 20 μm to 100 μm, a silicon substrate having a thickness of 200 μm to 2 mm, or a silicon dioxide substrate having a thickness of 200 μm to 2 mm.

The sensing apparatus for a fingerprint spectrum of the present disclosure uses a complementary cross-shaped plasma structure. The structure is conducive to improvement in a plasma enhancement effect of a terahertz transmission spectrum at a single frequency point.

The sensing apparatus for a fingerprint spectrum of the present disclosure uses a plasma cell array structure. The structure is conducive to achievement of enhancement and amplification functions of a fingerprint spectrum envelope of a wide spectrum.

According to the sensing apparatus for a fingerprint spectrum of the present disclosure, a 6×6 plasma cell array is set. Plasma enhancement peak frequency points are evenly distributed in the cell array in a range of 0.9 THz to 2 THz, such that a frequency range of substance fingerprint spectrum amplification is widened.

According to the sensing apparatus for a fingerprint spectrum of the present disclosure, a metal film is evaporated and deposited on a surface of a plasma cell. A thickness of the metal film is in the order of 100 nanometers and a surface of the metal film is even, such that coating uniformity of a sample is improved, thus avoiding measurement errors.

The sensing apparatus for a fingerprint spectrum of the present disclosure is provided with a complementary cross-shaped structure. As the structure is capable of exciting a local field mode of plasma, a resonance peak of a metasurface of a medium is wide.

Compared with the prior art, the sensing apparatus for a fingerprint spectrum of the present disclosure can simultaneously enhance and amplify spectral lines of substances of a wide fingerprint spectrum and a narrow fingerprint spectrum, and has strong robustness.

BRIEF DESCRIPTION OF DRAWINGS

FIG. 5A is a schematic diagram of a normalized absorption spectrum of D-carnitine, FIG. 5B is a schematic diagram of a normalized absorption spectrum of L-carnitine, FIG. 5C is a schematic diagram of absorption spectrum results of D-carnitine, and FIG. 5D is a schematic diagram of absorption spectrum results of L-carnitine.

DETAILED DESCRIPTION OF THE EMBODIMENTS

The present disclosure will be further described below with reference to specific examples.

The embodiment provides a terahertz sensing apparatus for a fingerprint spectrum with a plasma array. The sensing apparatus for a fingerprint spectrum is a frequency reconfigurable fingerprint sensor, is abbreviated as frequency agile fingerprint sensor (FAFS), and is configured to enhance terahertz trace sensing of a fingerprint spectrum.

Figure 1:
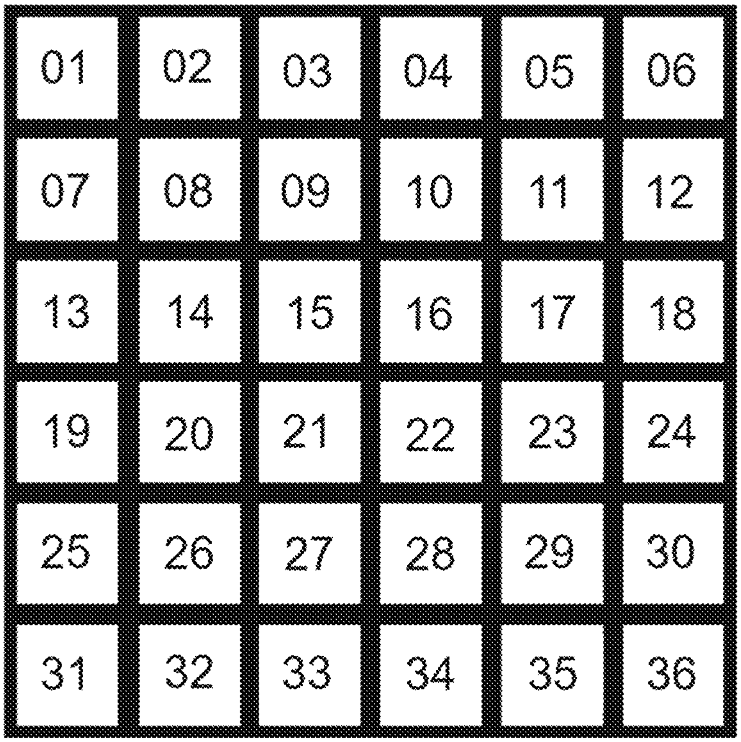
FIG. 1 is a schematic diagram of a plasma cell array of a sensing apparatus for a fingerprint spectrum of the present disclosure.

With reference to FIG. 1, the sensing apparatus for a fingerprint spectrum of the embodiment is constructed on the basis of a substrate. A 6×6 plasma cell array is arranged on the substrate. That is, the substrate is divided into 36 small zones (01 to 36 in FIG. 1) arranged in a rectangular array. Each of the small zones is referred to as a plasma cell. The 36 plasma cells arranged in the rectangular array constitute the 6×6 plasma cell array.

It should be noted that in the plasma cell array, each plasma cell is square and has a side length of 5 mm, each plasma cell is further divided into an effective zone and a peripheral zone, a square zone of 3 mm×3 mm in the middle of the plasma cell is used as the effective zone, a surrounding zone around the effective zone is used as the peripheral zone, and the peripheral zone has a width of 2 mm. In this way, two adjacent plasma cells can be conveniently cut and recombined.

Cross-recess unit cells are all densely arranged in the effective zone of each plasma cell. The cross-recess unit cells densely arranged in the plasma cell constitute a complementary cross-recess unit cell array.

Figure 2:
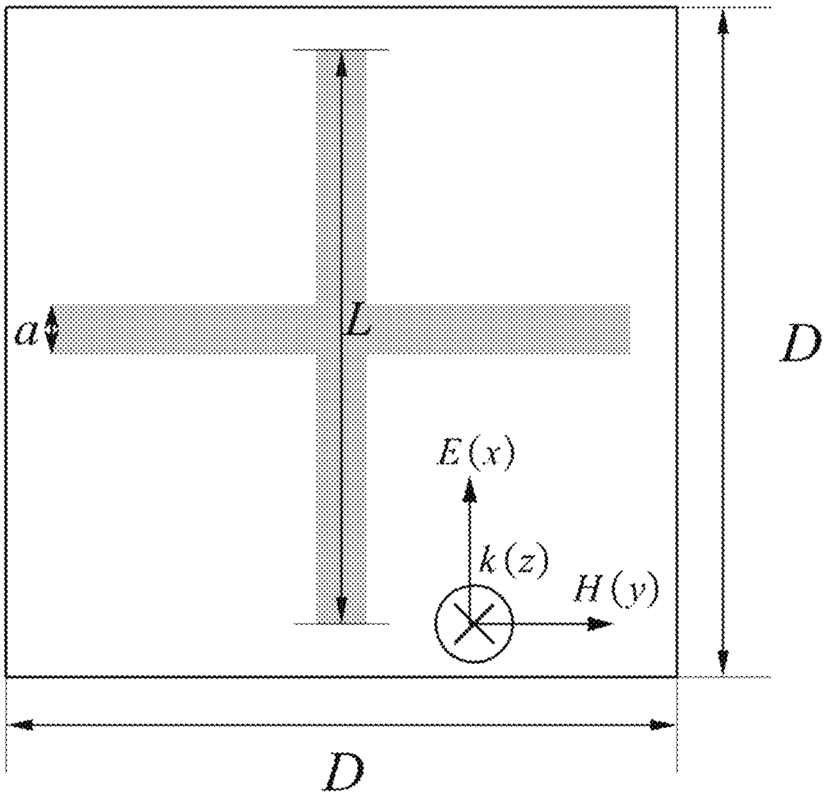
FIG. 2 is a schematic diagram of a cross-recess unit cell set in a plasma cell.

More specifically, with reference to FIG. 2, the cross-recess unit cell is of a very tiny zone structure. Specifically, the structure is implemented as follows:

In a very tiny zone (generally, a square zone having a side length of about 100 μm), a cross recess (in a regular cross shape) is provided in a center of the zone through photoetching.

A recess width of the cross recess is referred to as a slit width of the cross-recess unit cell, and is denoted by "a". The slit width a may be 2 μm to 11 μm.

A recess length of the cross recess is referred to as a unit length of the cross-recess unit cell, and is denoted by "L".

A side length of a tiny zone where the cross recess is located is referred to as periodicity of the cross-recess unit cell, and is denoted by "D".

A difference (D–L) between the periodicity and the unit length may be 5 μm to 11 μm.

It should be noted that the cross recess is formed on the substrate through photoetching, and a metal (gold, silver, copper, or aluminum) film is evaporated and deposited outside the cross recess and solidified to form the cross-recess unit cell. A thickness of the evaporated and deposited metal film is in an order of 100 nanometers, with a thickness range of 100 nm to 200 nm.

In the plasma cell, the complementary cross-recess unit cell array constituted by a plurality of cross-recess unit cells may achieve efficiency of a resonance peak enhanced by a high-Q plasma field.

The plasma cell array constituted by all the plasma cells may achieve an effect of covering a wide band with peak frequency of the resonance peak. In the embodiment, a frequency range covered is 0.9 THz to 2.0 THz.

It should be noted that different cross-recess unit cells are arranged in different plasma cells. The difference mentioned herein mainly indicates different size parameters of the cross-recess unit cells, that is, different unit lengths L of the cross-recess unit cells. The slit width a is same and is set as 5 microns. The "difference (D−L) between the periodicity and the unit length" of the cross-recess unit cells is same, and is set as 8 microns.

Figure 3:
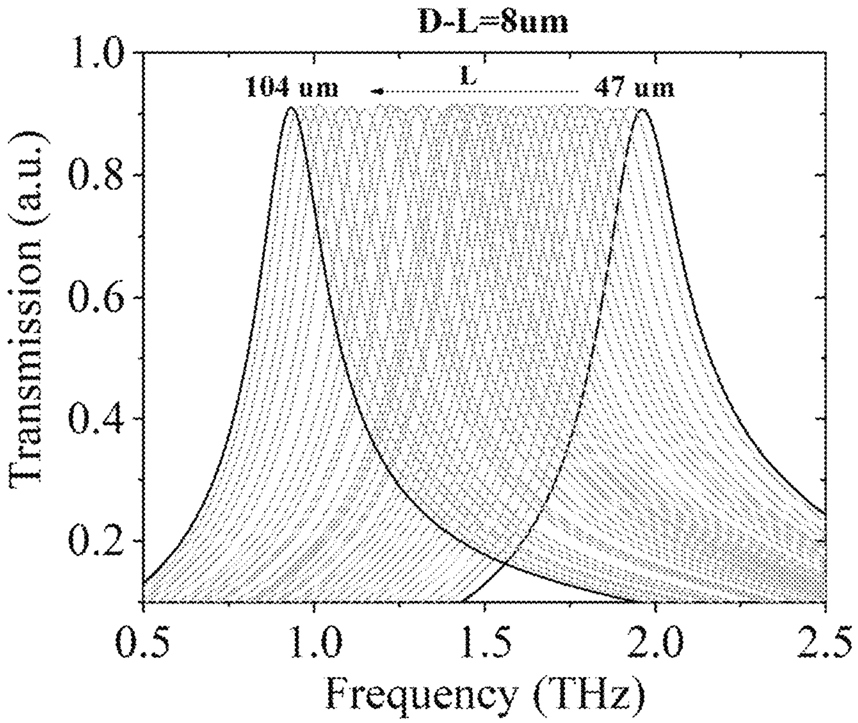
FIG. 3 is a schematic diagram of a transmission spectrum of a frequency agile fingerprint sensor (FAFS) when a=5 μm and D–L=8 μm are kept at different unit lengths L.

With reference to FIG. 3, FIG. 3 shows a transmission spectrum of an FAFS when a=5 μm and D−L=8 μm are kept at different unit lengths L.

Specifically,

The unit length L of the cross-recess unit cells of the plasma cell of the plasma cell array is set according to a diagonal progressive decrease rule.

The "diagonal progressive decrease" rule mentioned herein indicates that the unit length L of the cross-recess unit cells of all the plasma cells of the plasma cell array "progressively decreases from one array corner of the plasma cell array to a diagonal array corner".

With reference to FIG. 1, in the embodiment, a unit length L of cross-recess unit cells of a plasma cell (No. 01) at an upper left corner of the plasma cell array is set as 104 microns (corresponding to resonance peak frequency of 1.978 THz), and a unit length L of cross-recess unit cells of a plasma cell (No. 36) at a lower right corner (a diagonal corner of the upper left corner) of the plasma cell array is set as 47 microns (corresponding to resonance peak frequency of 0.932 THz).

The unit length L (micron) of the cross-recess unit cells of all 36 plasma cells is set in the following table (with reference to FIG. 1):

| | | | | | |
|---|---|---|---|---|---|
| 104 | 101 | 98 | 95 | 92 | 89 |
| 86 | 83 | 80 | 78 | 76 | 74 |
| 72 | 70 | 68 | 67 | 66 | 65 |
| 64 | 63 | 62 | 61 | 60 | 59 |
| 58 | 57 | 56 | 55 | 54 | 53 |
| 52 | 51 | 50 | 49 | 48 | 47 |

It may be seen that in FIG. 1, the unit lengths L of the cross-recess unit cells of the plasma cells decrease transversely from 01 to 06 and from 31 to 36, longitudinally from 06 to 36 and from 01 to 31, and diagonally from 01 to 36. Generally, the unit lengths L of the cross-recess unit cells of the plasma cells decrease on any path from 01 to 36. This is the "diagonal progressive decrease" rule.

It should be noted that 01, 06, 31, and 36 are all numbers of the plasma cells in FIG. 1.

The unit length of the cross-recess unit cells of each cell in the plasma cell array is set according to the diagonal progressive decrease rule, such that all frequency points in a frequency band of a wide fingerprint spectrum are evenly enhanced.

It may be reversely understood that the diagonal progressive decrease rule may be understood as a diagonal progressive increase rule, or both the diagonal progressive decrease and the diagonal progressive increase are collectively referred to as a diagonal unidirectional gradient rule.

In the embodiment, the unit length of the cross-recess unit cells of each plasma cell is evenly and discretely set in a range of 47 μm to 104 μm, and corresponding resonance peak frequency is 0.932 THz to 1.978 THz. Thus, wide-band setting of the resonance peak frequency of the entire plasma cell array is implemented.

It should be noted that, setting of the unit length L of the cross-recess unit cells is essentially setting of resonance peak frequency of the cross-recess unit cells.

For instance, if resonance peak frequency of cross-recess unit cells of a plasma cell numbered 01 needs to be set as 0.932 THz, a unit length L of the cross-recess unit cells is set as 104 μm (104 μm corresponds to 0.932 THz).

For instance, if resonance peak frequency of cross-recess unit cells of a plasma cell numbered 10 needs to be set as 1.226 THz, a unit length L of the cross-recess unit cells is set as 78 μm (78 μm corresponds to 1.226 THz).

In the sensing apparatus for a fingerprint spectrum of the embodiment, an frequency gap between resonance peaks of two adjacent cells of the plasma cell array is smaller than 7 GHz, and 36 frequency points in a frequency band of a wide fingerprint spectrum are evenly enhanced.

The sensing apparatus for a fingerprint spectrum of the embodiment is provided with a plurality of cross-recess unit cells. A cross-recess structure is conducive to a plasma field enhancement effect of a single frequency point, such that desirable technical effects of enhancing and amplifying a transmission intensity of the single frequency point can be achieved.

In addition, the sensing apparatus for a fingerprint spectrum of the embodiment is provided with cross-recess unit cells having different sizes in an array form. The structure is conducive to a plasma field enhancement effect of a plurality of frequency points in a wide-band range, such that desirable technical effects of enhancing and amplifying a wide-band fingerprint spectrum envelope can be achieved.

It should be noted that the substrate may be made of quartz (with a dielectric constant 3.84 and loss tan δ=0.001). Alternatively, the substrate is a polyimide substrate having a thickness of 20 μm to 100 μm, or a silicon or silicon dioxide substrate having a thickness of 200 μm to 2 mm.

According to the sensing apparatus for a fingerprint spectrum of the embodiment, 36 plasma cell arrays are set. Plasma enhancement peak frequency points are evenly distributed in the 36 cell arrays in a range of 0.9 THz to 2 THz, such that the technical problem that "frequency coverage of a series of narrow-band resonance peaks on the metasurface of the medium is currently smaller than 0.3 THz, which limits a frequency range of substance fingerprint spectrum amplification" in the background art is solved.

According to the sensing apparatus for a fingerprint spectrum of the embodiment, a metal film is evaporated and deposited on a surface of a plasma cell. A thickness of the metal film is in the order of 100 nanometers and is 2 orders of magnitude lower than surface roughness of the metasurface of the medium, such that the technical problem that "at present, a medium metasurface array technology has an uneven surface problem, such that a sample coating is uneven, bringing measurement errors" in the background art is solved.

The sensing apparatus for a fingerprint spectrum of the embodiment is provided with a complementary cross-shaped structure (a complementary cross-recess unit cell array). As the structure is capable of exciting a local field mode of plasma, the technical problem that "a resonance peak of the metasurface of the medium is narrow, so frequency resolution of a commercial time-domain terahertz spectral system cannot satisfy an actual measurement requirement" in the background art is solved.

In addition, the complementary cross-shaped structure excites the local field mode of plasma, and the mode easily has strong interaction with a vibration mode of a molecular structure, such that the technical problem that "the narrow resonance peak of the metasurface of the medium makes it difficult to excite an AIT effect of a substance fingerprint spectrum" in the background art is solved.

Two instances are provided below to specifically illustrate detection and identification of substances with the sensing apparatus for a fingerprint spectrum of the embodiment:

Instance 1

Figure 4A:
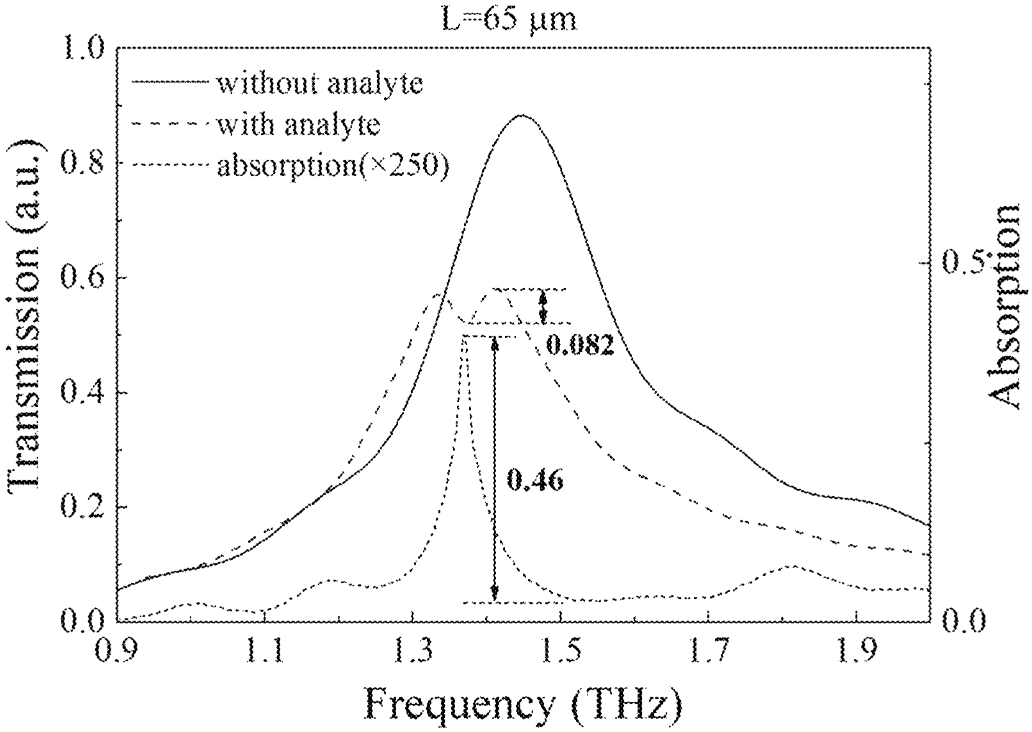
FIGS. 4A-4B are schematic diagrams of an α-lactose absorption spectrum (red) and absorption-induced transparency (AIT) observed in an FAFS/α-lactose system in Instance 1, where a unit length L=65 μm is set in FIG. 4A, and a unit length L=67 μm is set in FIG. 4B.
Figure 4B:
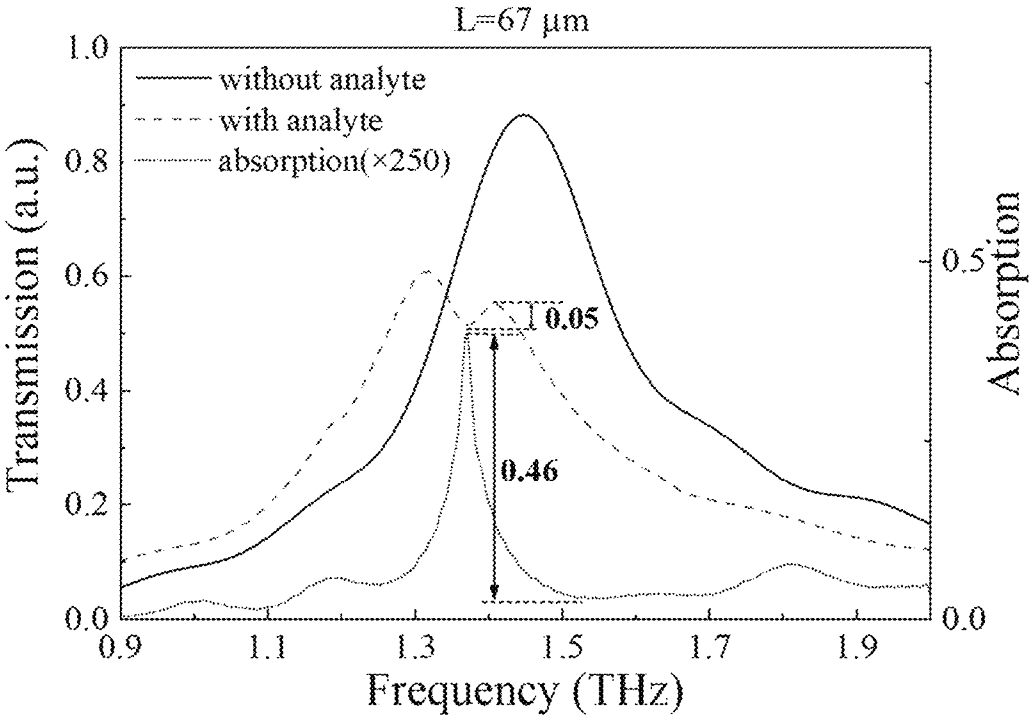

A 1 μm thick α-lactose layer was applied to the sensing apparatus for a fingerprint spectrum. An absorption spectrum of 1 μm thick α-lactose was measured, as shown in FIGS. 4A and 4B. In order to obtain a thin lactose film, α-lactose powder was diluted in a saturated aqueous solution and deposited on a surface of a plasma cell array. When L=65 μm (P18) and 67 μm (P16) was measured, amplitude transmission spectra of an FAFS with (a dotted line) and without (a solid line) the 1 μm thick α-lactose were shown in FIGS. 4A and 4B respectively. Results showed that a resonance shape changed obviously through excitation of AIT. A vibration signal peak was at 1.38 THz, and was close to previous results (1.37 THz). AIT transmission curves obtained through experimental measurement were shown in FIGS. 4A and 4B, and an enhancement factor was defined as a ratio of a small AIT inclination difference to a conventional absorption amplitude (as shown in FIGS. 4A and 4B). At P18 (L=65 μm), a maximum enhancement factor can reach 7 times, and an AIT effect can be observed in a wide pixel range from P13 to P23. The FAFS can capture a narrow absorption line of an analyte without being influenced by uncertainty of an analyte thickness, and cover a large pixel range so as to improve robustness of AIT.

Instance 2

Figure 5A:
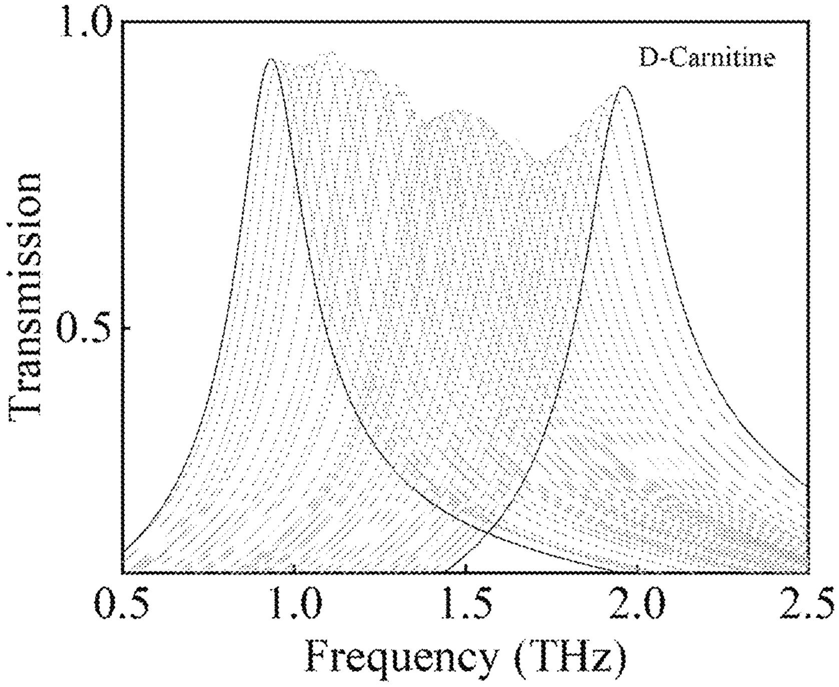
FIGS. 5A-5D are schematic diagrams of multiplexing results through the FAFS in Instance 2, where
Figure 5B:
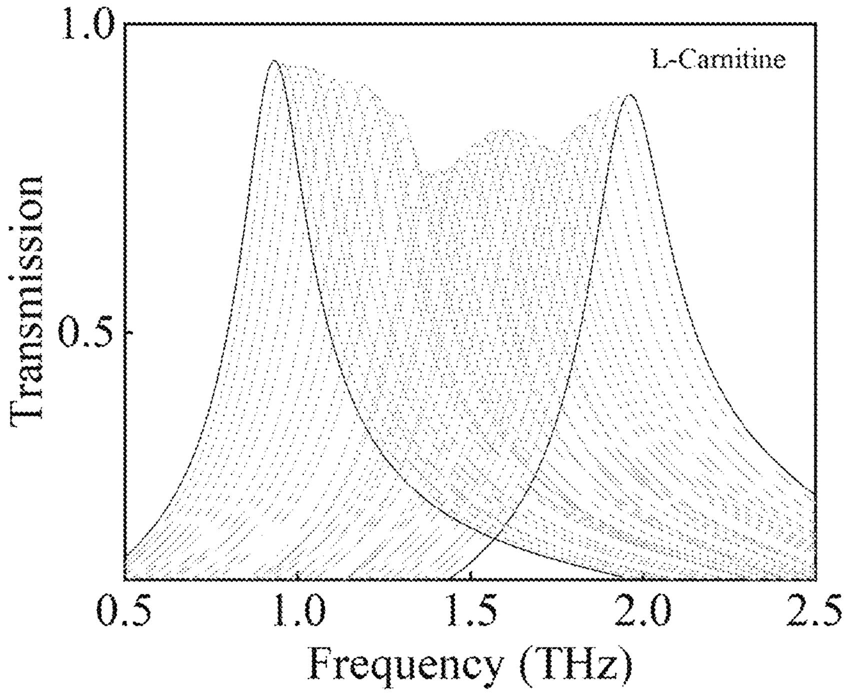
Figure 5C:
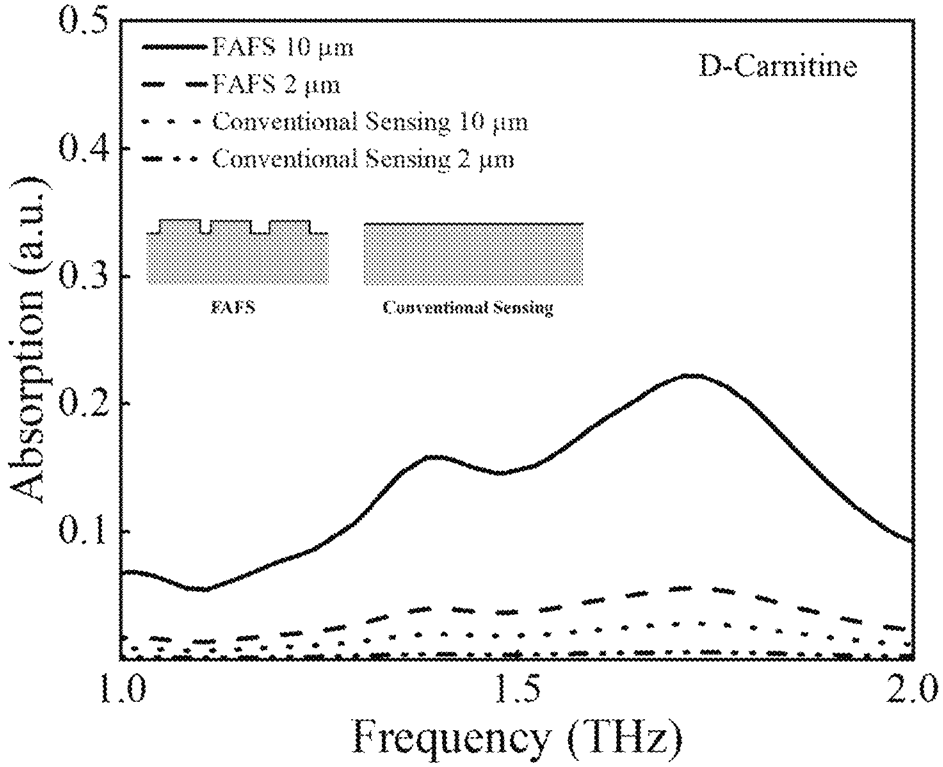
Figure 5D:
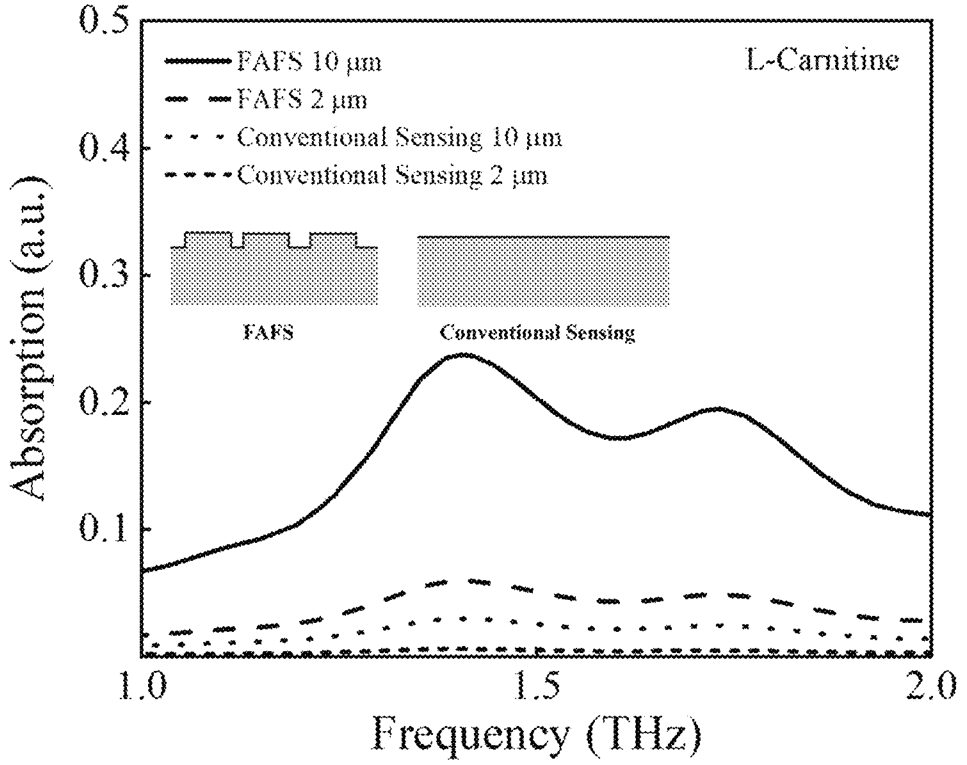

The FAFS was used to identify trace chiral substances by scanning and enhancing an absorption spectrum. A terahertz absorption spectrum of carnitine (D-carnitine and L-carnitine) showed two wide-band absorption lines. Corresponding frequencies of absorption peaks were 1.39 THz and 1.72 THz, respectively. In results shown in FIGS. 5A and 5B, a 10 μm carnitine layer covering the FAFS led to modulation of a transmission spectral intensity of a single cell due to coupling between molecular vibration and an enhanced electric field around a cross-recess resonator. The transmission modulation was related to molecular vibration of D-carnitine and L-carnitine. Pixel absorption spectrum envelopes of chiral carnitine of 1 μm and 10 μm were shown in FIGS. 5C and 5D. FIGS. 5C and 5D showed traditional terahertz absorption spectra of D-carnitine and L-carnitine. Absorption peak positions of D-carnitine and L-carnitine were basically consistent and both have two absorption peak frequencies of 1.39 THz and 1.72 THz. Absorption of the D-carnitine at 1.39 THz was lower than that of the L-carnitine, while absorption of the D-carnitine at 1.72 THz was higher than that of the L-carnitine. When a thickness was smaller than 10 μm, an error of qualitative analysis increased, and an absorption peak position cannot be found through conventional sensing. The FAFS reproduced absorption characteristics of wide-band carnitine. At 1.39 THz and 1.72 THz, an absorption amplitude of 10 μm thickness analysis was increased by about 8 times, and an absorption amplitude of 1 μm thickness analysis was increased by about 10 times. At positions near 1.39 THz and 1.72 THz, a linewidth provided by plasma resonance in a plasma cell was narrower than a spectral characteristic size of absorption bands of D-carnitine and L-carnitine. The advantage made it possible to read absorption characteristics of chiral substances at wide-band discrete frequency.

What are described above are merely preferred examples of the present disclosure, and are not intended to limit the protection scope of the present disclosure. Thus, any modifications, equivalent replacements, and improvements made within the spirit and principle of the present disclosure should fall within the protection scope of the present disclosure.

What is claimed is:

1. A terahertz sensing apparatus for a fingerprint spectrum with a plasma array, wherein the sensing apparatus for the fingerprint spectrum is based on a substrate, a plasma cell array is arranged on the substrate, and cross-recess unit cells are densely arranged in each cell of the plasma cell array, wherein in a plasma cell of the plasma cell array, the cross-recess unit cells densely arranged constitute a complementary cross-recess unit cell array, and wherein a unit length of the cross-recess unit cells of the plasma cell of the plasma cell array is set according to a form of diagonal unidirectional gradient.

2. The terahertz sensing apparatus for the fingerprint spectrum with the plasma array according to claim 1, wherein the diagonal unidirectional gradient is a diagonal progressive decrease or a diagonal progressive increase.

3. The terahertz sensing apparatus for the fingerprint spectrum with the plasma array according to claim 1, wherein in the plasma cell array, the unit length of the cross-recess unit cells of each plasma cell is evenly and discretely set in a range of 47 μm to 104 μm.

4. The terahertz sensing apparatus for the fingerprint spectrum with the plasma array according to claim 1, wherein the plasma cell array is a 6×6 array.

5. The terahertz sensing apparatus for the fingerprint spectrum with the plasma array according to claim 1, wherein in the plasma cell array, each plasma cell is square and has a side length of 5 mm, each plasma cell is divided into an effective zone and a peripheral zone, a square zone of 3 mm×3 mm in a middle of the plasma cell is used as the effective zone, a surrounding zone around the effective zone is used as the peripheral zone, and the peripheral zone has a width of 2 mm; and the cross-recess unit cells arranged in the plasma cell are all arranged in the effective zone.

6. The terahertz sensing apparatus for the fingerprint spectrum with the plasma array according to claim 1, wherein a structure of the cross-recess unit cell is implemented as follows: in a tiny zone of the plasma cell, a cross recess is provided in a center of the zone through photo-etching, and a metal film is evaporated and deposited outside the cross recess and solidified to form the cross-recess unit cell.

7. The terahertz sensing apparatus for the fingerprint spectrum with the plasma array according to claim 6, wherein the metal film evaporated and deposited outside the cross recess is made of gold, silver, copper, or aluminum.

8. The terahertz sensing apparatus for the fingerprint spectrum with the plasma array according to claim 1, wherein the substrate is made of quartz, or alternatively, the substrate is a polyimide substrate having a thickness of 20 μm to 100 μm, a silicon substrate having a thickness of 200 μm to 2 mm, or a silicon dioxide substrate having a thickness of 200 μm to 2 mm.

* * * * *